United States Patent [19]

Hayes

[11] 4,454,900
[45] Jun. 19, 1984

[54] VENEER LATHE DRIVE WITH POWERED ROLLS

[75] Inventor: Leonard L. Hayes, Lewiston, Id.

[73] Assignee: The Coe Manufacturing Company, Painesville, Ohio

[21] Appl. No.: 393,130

[22] Filed: Jun. 28, 1982

[51] Int. Cl.³ .............................................. B27L 5/02
[52] U.S. Cl. ................................. 144/213; 144/209 R
[58] Field of Search ................... 144/209 R, 211, 212, 144/213, 365; 82/45, 38, 39

[56] References Cited

U.S. PATENT DOCUMENTS

| | | | |
|---|---|---|---|
| 4,380,259 | 4/1983 | Brookhyser et al. | 144/213 |
| 4,381,023 | 4/1983 | Fronczak et al. | 144/209 R |
| 4,396,049 | 8/1983 | Calvert et al. | 144/209 R |

Primary Examiner—W. D. Bray
Attorney, Agent, or Firm—Klarquist, Sparkman, Campbell, Leigh & Whinston

[57] ABSTRACT

A veneer lathe apparatus is described including three powered drive rolls between which a log is clamped for rotation about a lathe axis while the log is engaged by the lathe knife for peeling a sheet of veneer therefrom. One of the powered rolls is employed as a reference roll for the other two rolls, such reference roll being held by a reference means locked in a reference position during peeling. The reference position of the reference roll is automatically adjusted relative to the lathe axis and to the other two drive rolls in response to changes in position of the lathe knife during peeling to maintain such reference roll in contact with the log. The other two drive rolls are driven by a common drive motor and supported on common support arms for movement toward and away from the reference roll while maintaining the spacing between such other two drive rolls substantially constant. The reference means includes a cam member for determining the horizontal path of the reference roll and for locking the reference roll in a vertical reference position during peeling. An automatic adjustment means including a motor driven lead screw is employed for pivoting the cam member vertically in response to changes in the position of the lathe knife during peeling to adjust the vertical reference position. The other two powered rolls are mounted on common support arms which pivot about an eccentric that is rotated by an eccentric motor to different rotational positions in response to changes in position of the knife to adjust the position of the pivot axis of such support arms in order to maintain such two drive rolls in contact with the log during peeling.

23 Claims, 7 Drawing Figures

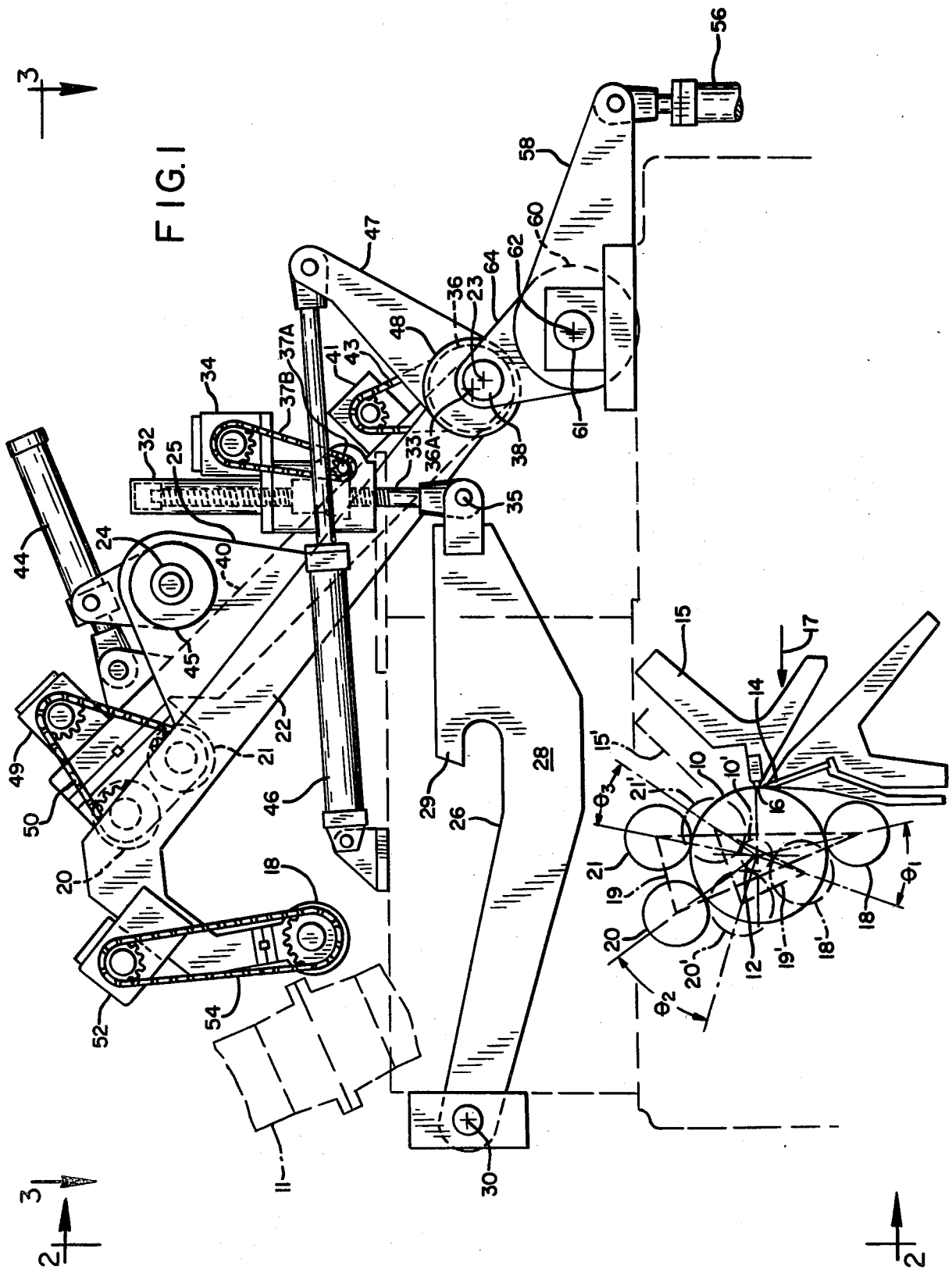

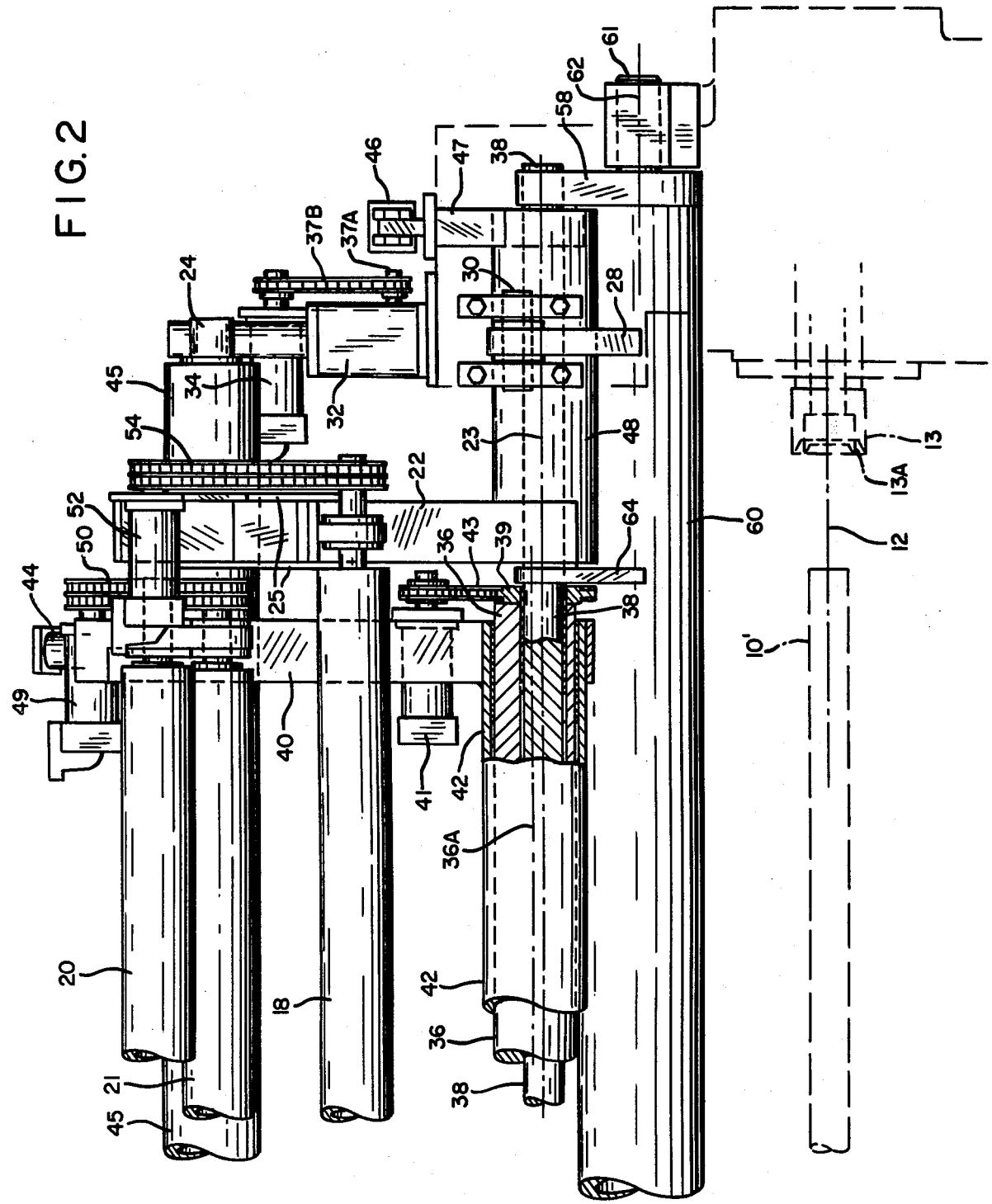

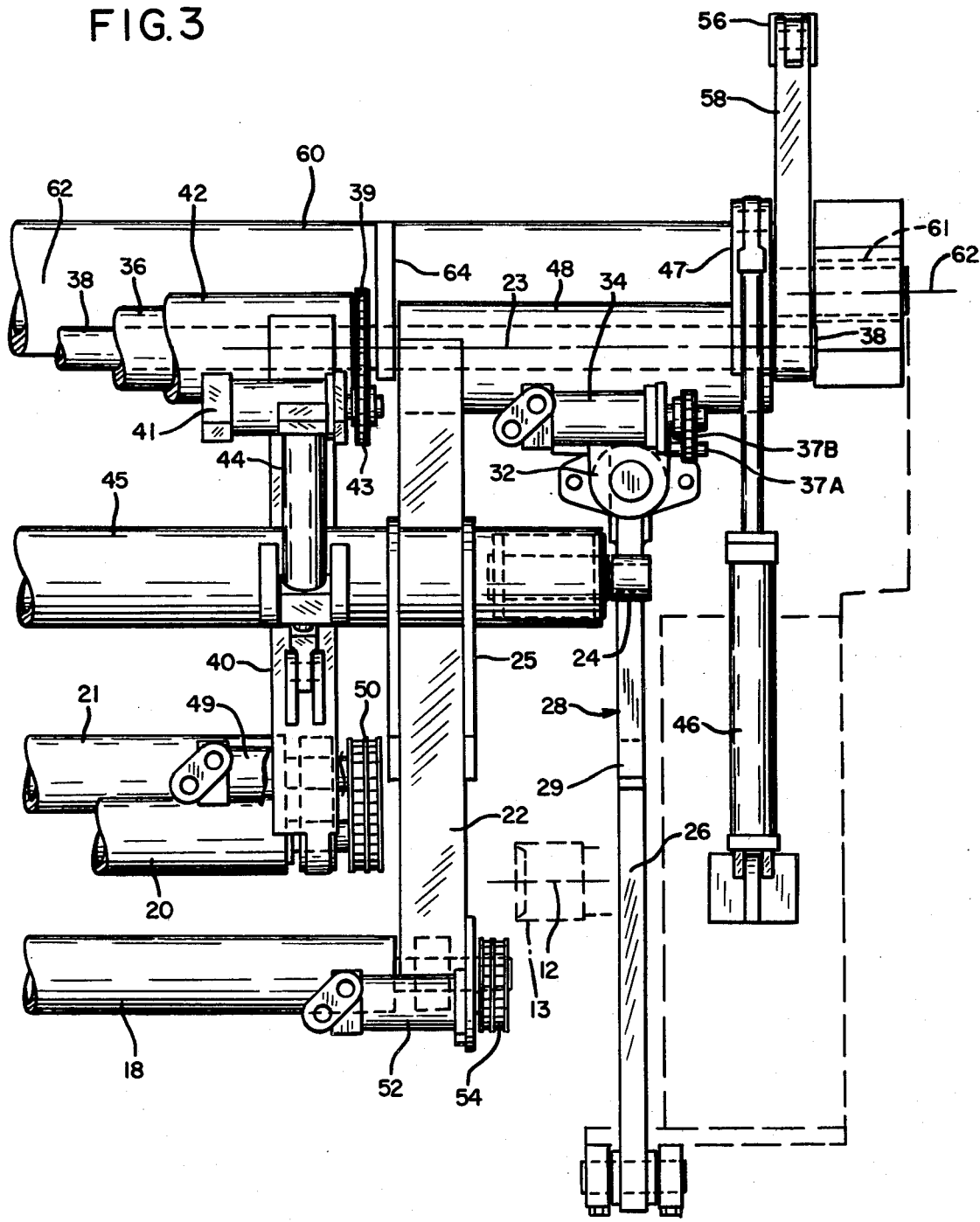

VENEER LATHE DRIVE WITH POWERED ROLLS

BACKGROUND OF INVENTION

The subject matter of the present invention relates generally to wood veneer peeling and in particular to a veneer lathe apparatus having a plurality of powered drive rolls which contact the side of a log to clamp such log between such rolls for rotating the log about a lathe axis during peeling. Three powered drive rolls are preferably employed so that the lathe spindles which contact the opposite ends of the log for rotation thereof can be eliminated or reduced in size thereby enabling the log to be peeled to a smaller diameter of about $3\frac{1}{2}$ inches or less. Lathe spindles may be employed to rotate the log during initial peeling until the diameter of the log is reduced to a predetermined diameter at which time the powered drive rolls are moved into engagement with the sides of the log to supply additional torque for rotating the log or for supplying all of the torque for rotation if the lathe spindles are disengaged.

The three drive rolls extend over the major portion of the length of the log to prevent deflection of the log when it is peeled to a small diameter which would otherwise cause thickness variations in the veneer. One of the drive rolls is locked in a reference position during peeling and serves as a reference roll for the other two drive rolls in clamping the log with its optimum yield axis in alignment with the lathe axis. U.S. Pat. No. 4,197,888 of McGee et al. issued Apr. 15, 1980 shows how the optimum yield axis of a log can be determined automatically by scanning it with light beams. The position of the reference roll is adjusted automatically toward the lathe axis and arcuately about such axis in response to movement of the lathe knife during peeling to maintain the reference roll in contact with the log and to keep the log aligned with the lathe axis.

It has been previously proposed in U.S. Pat. No. 4,073,326 of Pank et al issued Feb. 14, 1978 to provide a veneer peeling machine employing two powered drive rolls called pressure rolls and one idler roll called a reaction roll for clamping the log between such rolls and thereby eliminating the need for lathe spindles engaging the opposite ends of the log. However, unlike the present invention, the idler roll is not a powered roll and, while being a reaction roll against which the log is urged by the two powered pressure rolls, such idler roll does not serve as an independent reference for the other two powered drive rollers. Thus, the movement of the reaction roll of such apparatus is guided by a cam mounted on the support of one of the pressure rolls and is not locked in a vertical reference position on a cam separate from the other drive rolls which is adjusted in accordance with the position of the lathe knife, in the manner of the present invention. The two pressure rolls are not mounted on a common support so that the spacing between such rolls is fixed, but the spacing is changed during peeling to move the pressure rolls toward a reference plane. In addition, this patent does not disclose the use of an eccentric to change the pivot points of the support arms for the two powered pressure rolls in order to maintain such rolls in contact with the log, in the manner of the present invention.

U.S. Pat. No. 2,884,966 of Zilm issued May 5, 1959, also shows a veneer lathe having two powered drive rolls. His two powered rolls are coupled together and mounted on a common support so that the spacing between such rolls is fixed. However, these drive rolls only extend over a short portion of the length of the log which is much less than the major portion of such length, and therefore, cause deflection in the form of a compound bowing of the log when it is peeled to a small diameter. This deflection produces non-uniformities in the thickness of the veneer width across the veneer strip. Also, this lathe does not use a third powered drive roll.

U.S. Pat. No. 3,421,560 of Springate issued Jan. 14, 1969 shows a similar teaching, except that he employs two longitudinally spaced pairs of idler back-up rolls, each pair mounted on a common support which pivot into contact with the log by a cam means. Unlike the present invention, there is no reference drive roll which is locked in a vertical reference position and against which the log is urged by two other drive rolls. However, such patent discloses a lathe knife means having a nose bar with a powered roller which is driven by contact with another roller in the nose bar assembly. Springate also suffers from the defect that his back-up rolls do not contact the log over a major portion of its length and therefore permit deflection which would apparently be in the form of double compound bowing of the log when its diameter is reduced to a small diameter.

It has previously been proposed in the veneer lathe apparatus of U.S. patent application Ser. No. 224,081 of Brookhyser et al filed Jan. 12, 1981 to employ a powered back-up roll and an idler roll which extend along the major portion of the length of the log to prevent deflection of a log core of small diameter. However, this prior lathe apparatus does not employ a plurality of powered drive rolls to clamp the log between such rolls so that the latch spindles can be eliminated and does not include a cam for locking a reference drive roll in a reference position so that it serves as a reference surface for the other two drive rolls, in the manner of the present invention.

The veneer lathe apparatus of the present invention has several advantages over the previous lathe apparatus including the ability to apply more torque or rotational force to the log by employing three powered drive rolls which clamp the log between such rolls. The use of three powered drive rolls provides sufficient torque power so that lathe spindles or chucks which normally engage the opposite ends of the log can be eliminated or replaced with smaller spindles, thereby enabling the log to be peeled to a smaller diameter. In addition, by eliminating the need for such lathe spindles or reducing the torque which must be applied to such spindles at small log diameters, breakage of the ends of the log and/or spin-out of the lathe spindles from such ends is prevented. Furthermore, since the three powered drive rolls extend along the major portion of the length of the log, deflection of the log is prevented when it is peeled to a small diameter so that the veneer thickness is more uniform across the width of the veneer strip.

By employing one of the three powered drive rolls as a reference roll for the other two rolls and locking such reference roll in a vertical reference position that is adjusted relative to the lathe axis automatically in response to reductions in the log diameter by sensing the position of the lathe knife, more accurate peeling of veneer with a predetermined thickness is achieved. The veneer lathe drive of the present invention is simple, reliable and accurate in operation because it uses a cam means for determining the reference position of the reference roll independent of the other two drive rolls and employs an eccentric to change the pivot point of the common support arm for the two other drive rolls in order to maintain such other rolls in contact with the log at all times during peeling in spite in reductions in diameter of the log. Another advantage of the present lathe roll drive is that a more efficient drive coupling between the drive rolls and the log is achieved without reducing accuracy in the veneer peeling by providing the surface of the reference roll of a rigid material such as metal while providing the surface of the other two drive rolls with a compressible high friction material such as polyurethane or other elastomer material.

SUMMARY OF INVENTION

It is therefore one object of the present invention to provide an improved veneer lathe apparatus employing a plurality of powered drive rolls which engage the side of a log and extend along a major portion of its length to clamp the log between such rolls for rotation of such log during peeling, and to prevent deflection of the log so that the veneer is of more uniform thickness.

Another object of the invention is to provide such a veneer lathe apparatus employing three powered drive rolls to apply more power for rotation of the log so that lathe spindles can be eliminated or smaller spindles used in rotating the log to enable the log to be peeled to a smaller diameter.

A further object of the invention is to provide such a lathe apparatus in which one of the three drive rolls serves as a reference roll and is locked in a reference position during peeling to provide a reference surface against which the log is urged by the other two drive rolls thereby enabling more accurate peeling of veneer with a predetermined thickness.

An additional object of the invention is to provide such a veneer lathe apparatus in which the reference roll is supported on a cam means for guiding its horizontal movement and for locking such reference roll in a vertical reference position which is automatically adjusted in response to movement of the lathe knife during peeling to compensate for the reduction of log diameter and to maintain it in contact with the log in a simple, reliable and accurate manner.

Still another object of the invention is to provide such a veneer lathe apparatus in which the other two drive rolls are mounted on a common support arm which is pivoted about an eccentric member that is rotated into different positions in response to movement of the lathe knife in order to change the pivot point of such common support arm to maintain such drive rolls in contact with the log during peeling in a simple, reliable and accurate manner.

A still further object of the invention is to provide such a veneer lathe apparatus which employs a rigid material on the surface of the reference drive roll and employs a compressible, high-friction material on the surface of the other two drive rolls to provide more efficient drive coupling from the drive rolls to the log while also providing an extremely accurate reference surface against which the log is held during peeling.

DESCRIPTION OF DRAWINGS

Other objects and advantages of the invention will be apparent from the following detailed description of a preferred embodiment thereof and from the attached drawings of which:

FIG. 1 is a side elevation view of a veneer lathe apparatus in accordance with the present invention;

FIG. 2 is a front elevation view of a portion of FIG. 1 taken along the line 2—2;

FIG. 3 is a top elevation view of a portion of FIG. 1 taken along the line 3—3.

DESCRIPTION OF PREFERRED EMBODIMENT

Figure 4A:
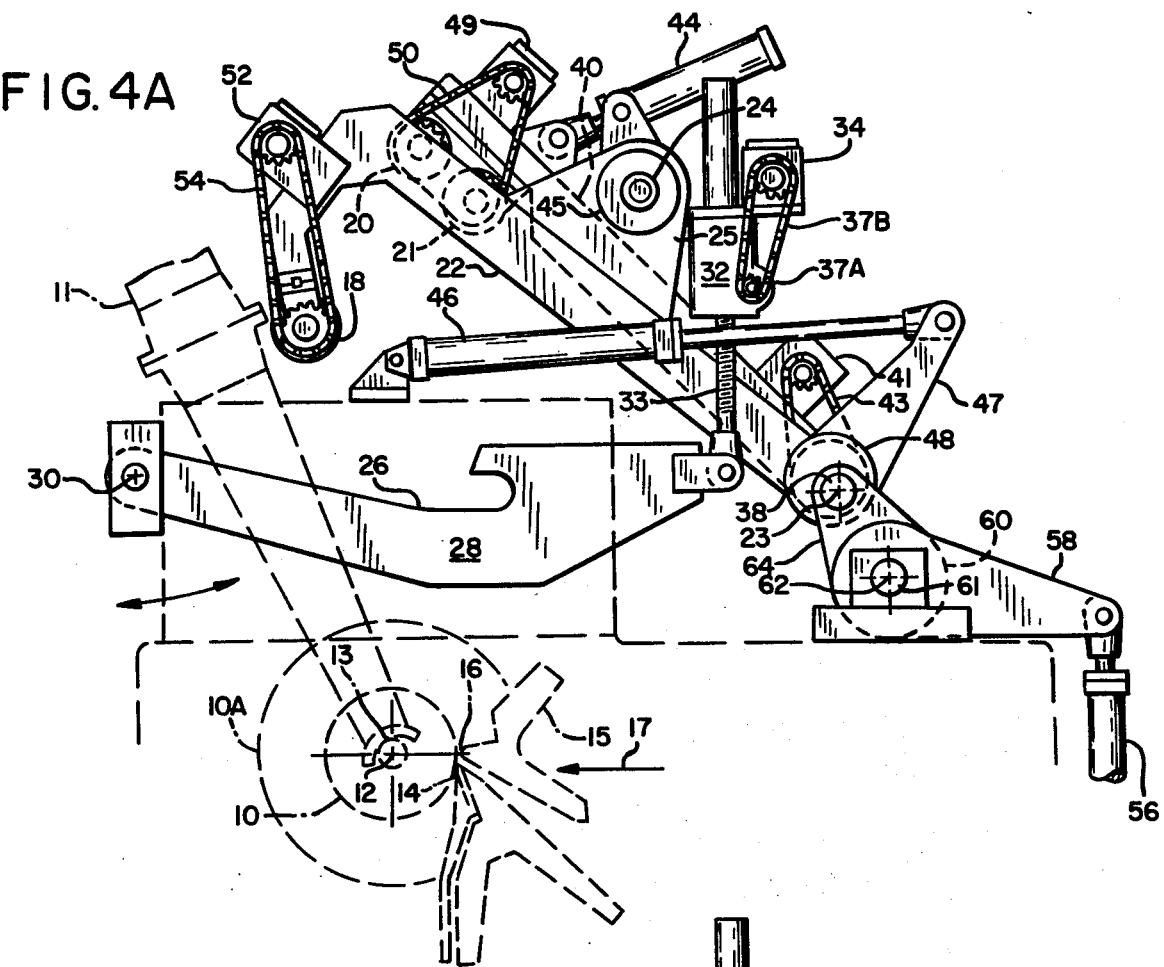
FIGS. 4A to 4D are side elevation views of different steps in the operation of the apparatus of FIGS. 1 to 3.

As shown in FIGS. 1, 2 and 3 the veneer lathe apparatus of the present invention is employed to peel a log 10 which is conveyed to the lathe by a pair of pivoting transfer arms 11 which engage the opposite ends of such log and pivot the log from a lathe charger (not shown) where the optimum yield axis of the log is determined in the manner shown in U.S. Pat. No. 4,197,888 of McGee et al. issued Apr. 15, 1980. After the log is located by the transfer arms 11 with its optimum yield axis in alignment with a lathe axis 12, it may be engaged by a pair of lathe spindles or chucks 13 at the opposite ends thereof and the transfer arms unclamped to release the log for rotation in the lathe. The log is rotated by the spindles 13 about the lathe axis 12 and such log is engaged by a knife 14 at a point immediately behind a pressure bar 15 whose nose roller 16 presses against the log for peeling veneer sheets therefrom. The lathe knife 14 and the pressure bar 15 including nose roller 16 are mounted on a knife carriage for movement in the direction of arrow 17 toward the lathe axis 12 for peeling in a conventional manner. As a result, the log is peeled from a large initial diameter of, for example about 48 inches, to an intermediate diameter 10 of about 14 inches and then to a minimum diameter log 10' which may be 3½ inches or less in diameter. In accordance with the present invention, three powered drive rolls including a lower reference drive roll 18 and two upper drive rolls 20 and 21 are employed to apply additional torque or rotating force to the log by clamping the sides of the log when it reaches the intermediate diameter 10 of FIGS. 1 and 4B and rotating such log until it is peeled to the minimum diameter 10'.

As shown in FIG. 1 the reference roll 18 is moved inward towards the lathe axis 12 and rotated clockwise through an acute angle $\theta_1$ to the roll position 18' in order to maintain contact with the log as such log is peeled from its intermediate diameter 10 to its minimum diameter 10'. In a similar manner, the two upper drive rolls 20 and 21 are moved inward toward the lathe axis 12 and are connected together so that their axes are effectively moved about the lathe axis, respectively, counterclockwise through acute angle $\theta_2$ and clockwise through angle $\theta_3$ into positions 20' and 21'. However, at all times during peeling the axis of rotation 12 of the log remains within a clamping triangle 19 formed by three lines joining the axes of the reference roll 18 and the two upper drive rolls 20 and 21. As a result, the log remains clamped at all times between these three rolls. The reference roll 18 is locked in a predetermined reference position to serve as a reference surface for the log as it is pressed into contact with such reference roll by the two upper drive rolls 20 and 21 to maintain the optimum yield axis of the log in alignment with the lathe axis 12.

The reference roll 18 is mounted at its opposite ends on a pair of lower roll support arms 22 which pivot about a pivot axis 23. A cam follower roller 24 attached to a flange 25 on the lower support arm 22 is moved into engagement with a cam surface 26 on a cam member 28 as such support arm is pivoted down about axis 23 from the raised position shown in FIGS. 1 and 4A to the lower positions of FIGS. 4B, 4C and 4D. The cam member 28 guides the horizontal path of the cam follower 24, the support arms 22 and the reference roll 18 in the lowered position of such reference roll during clamping. In addition, the cam member 28 is provided with a hook projection 29 which extends back over the cam surface 26 and locks the cam follower 24 against vertical movement and against further horizontal movement to the right so that the reference roll 18 is locked in a reference position during peeling. The vertical reference position of the reference drive roll 18 is automatically adjusted by pivoting the cam 28 about a pivot 30 at the left end thereof with a positioner means 32,34 in response to changes in the position of the lathe knife 14 during peeling. This compensates for reductions in the diameter of the log 10 in order to maintain the reference roll in contact with the surface of the log during peeling. The positioning means includes a lead screw positioner 32 which is powered by a positioning motor 34. The positioning motor 34 is synchronized mechanically or electrically to the movement of the knife carriage for the lathe knife 14 in order to rotate the cam member 28 about pivot 30 the proper amount to adjust the vertical reference position of the cam follower 24 and the reference roller 28 so that such reference roll is maintained in contact with the log during peeling. In this manner the log is held clamped between the drive rolls with its optimum yield axis in alignment with the lathe axis 12 even if the lathe spindles 13 are disengaged. The lead screw positioner 32 has a lead screw shaft 33 with one end connected at a pivot 35 to the cam member 28 for raising the lowering such cam member as the screw shaft is engaged by a rotating nut driven by the motor 34, and thereby moved longitudinally. Thus, the lead screw shaft is threaded and is engaged by a rotating nut within the lead screw positioner which is rotated by a worm gear 37A coupled by a connecting chain 37B to the output shaft of the positioning motor 34.

An eccentric member 36 which slowly rotates into different rotational positions about a shaft 38 also pivoting about the common pivot axis 23, is employed to change the position of the pivot axis of a pair of common support arms 40 supporting the upper drive rolls 20 and 21. The upper roll support arms 40 are fastened to a pivot sleeve 42 that rotates about the eccentric 36 whose axis 36A is spaced laterally from the axis 23 of shaft 38, as shown in FIG. 2. The eccentric 36 is connected at one end by a gear 39 to the output shaft of an eccentric drive motor 41 through a coupling chain 43 for rotation about shaft 38 to change the angular position of the pivot axis 36A of the upper support arms 40 for the drive rolls 20 and 21 about the pivot axis 23 of the lower support arms 22, as shown in FIG. 1. The eccentric drive motor 41 is mechanically or electrically synchronized to the movement of the knife carriage supporting lathe knife 14 for rotation of the eccentric to move the two upper drive rolls from the positions 20 and 21 in contact with the intermediate diameter log 10 to the positions 20' and 21' in contact with the minimum diameter log core 10'. Thus, the eccentric 36 is rotated by the drive motor 41 during peeling after the upper support arms are lowered from the raised position of FIG. 1 to the lowered position of FIGS. 4C and 4D.

A press cylinder 44 mounted on the support shaft 45 for the cam follower 24 as shown in FIGS. 1 and 3, has its piston rod connected to the support arm 40 for the upper rolls 21 and 22. Cylinder 44 presses the upper rolls 20 and 21 down toward the reference roll 18 to maintain contact with the log during peeling as shown in FIG. 4D. A reference roll cylinder 46 fixedly mounted on the frame has its piston rod attached to one end of a crank arm 47 which is fixed to a crank sleeve 48 for rotating such crank sleeve about shaft 38 and pivot axis 23. The lower support arm 22 is attached to sleeve 48 for rotation with such sleeve, thereby pivoting the reference roller 18 beneath the log 10 counterclockwise from the raised position shown in FIGS. 1 and 4A to the lowered position shown in FIGS. 4B and 4C as the cam follower 24 rolls horizontally to the right along the cam surface 26 of cam 28.

A first roll drive motor 49 is mounted on the upper support arm 40 and coupled by a chain 50 to the pair of upper drive rolls 20 and 21 for rotation of such drive rolls. The reference drive roll 18 is driven by a second drive motor 52 mounted on the lower support arm 22 and coupled to such roll by a coupling chain 54. Thus, the reference roll is driven by a separate motor from that driving the other two powered drive rolls to provide additional torque to the log.

Figure 4B:
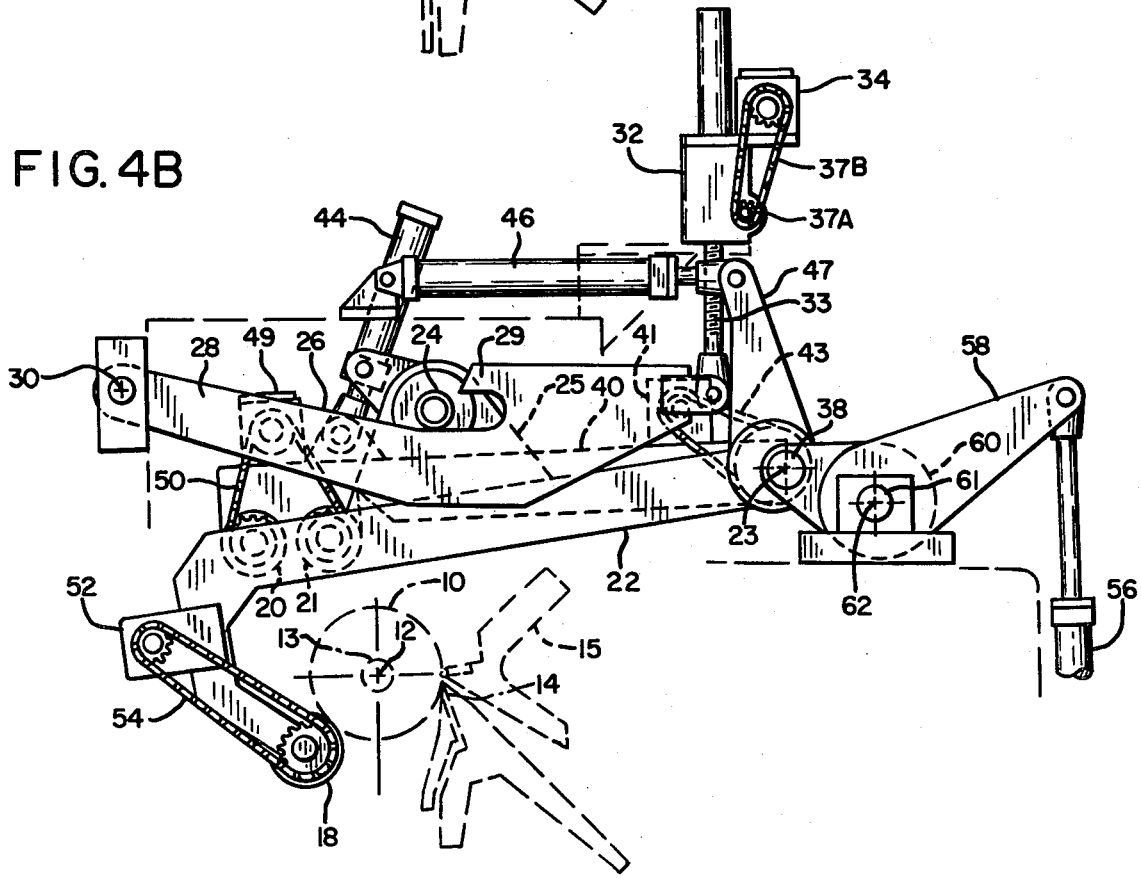

Both the upper support arm 40 and the lower support arm 22 are lowered simultaneously from the raised position of FIGS. 1 and 4A and moved to the left into the lowered position of FIG. 4B by an off-set cylinder 56 whose piston rod is coupled to one end of a link 58 which is connected to a main support shaft 60 for rotation with such main support shaft on bearings 61 about an axis 62. The pivot shaft 38 about which the lower support arm 22 and the upper support arm 40 rotate, is fixed by links 64 to the main shaft 60 for rotation of such pivot shaft about axis 62 with such main shaft to the off-set position shown in FIG. 4B. This enables the reference roll 18 to clear the log as the arm 22 is moved into the lowered position.

The operation of the veneer lathe drive apparatus of the present invention is shown in FIGS. 4A, 4B, 4C and 4D which each illustrate different steps in such operation. As shown in FIG. 4A the support arms 22 and 40 for the reference roll 18 and for the two upper drive rolls 20 and 21 are initially held in a raised position by retracting the off-set cylinder 56 to rotate the main support shaft 60 about its axis 62 thereby raising the pivot shaft 38. In addition, the lower arm support cylinder 46 is extended to rotate the lower support arm 22 and the reference roll 18 about pivot axis 23 to the most clockwise and raised position of FIG. 4A. The upper arm support cylinder 44 is retracted to rotate the upper support arm 40 and the upper drive rolls 20 and 21 about shaft 38 to its most clockwise and raised position. In this raised position there is sufficient clearance for a log block of maximum diameter 10A up to 48 inches in diameter to be conveyed into such lathe by the pivoting transfer arm 11 of the lathe charger. Once the log is positioned in the lathe charger so its optimum yield axis is aligned with the charger axis 12 the lathe spindles 13 are extended into engagement with the opposite ends of the log to hold it in this aligned position. The lathe spindles may then rotate the log as the lathe knife 14 is moved into contact with the outer surface of the log for peeling veneer therefrom until the log is rounded into a right circular cylinder.

As shown in FIG. 4B the lower support arm 22 and the upper support arm 40 are pivoted about shaft 38 into the lowered position so that such drive rolls are adjacent to, but not contacting the log as the peeled log approaches its intermediate diameter 10. This is accomplished by extending the piston in the off-set cylinder 56 and by retracting the piston in cylinder 46. As a result, the lower support arm 22 is rotated downward and moved to the left by the off-set to clear log 10 until the cam follower 24 engages the cam surface 26 of the cam member 28. Continued rotation of arm 22 causes horizontal movement of the cam follower 24 to the right along cam surface 26 to position the reference roll 18 beneath the log 10. Peeling continues until the diameter of the log reaches the predetermined intermediate diameter 10 of, for example 14 inches, at which time the reference roll 18 and the two upper drive rolls 20 and 21 are shifted to the right and pivoted into contact with the log by fully retracting the off-set cylinder 56 and extending cylinders 44 and 46 slightly into the drive position shown in FIG. 4C.

Figure 4C:
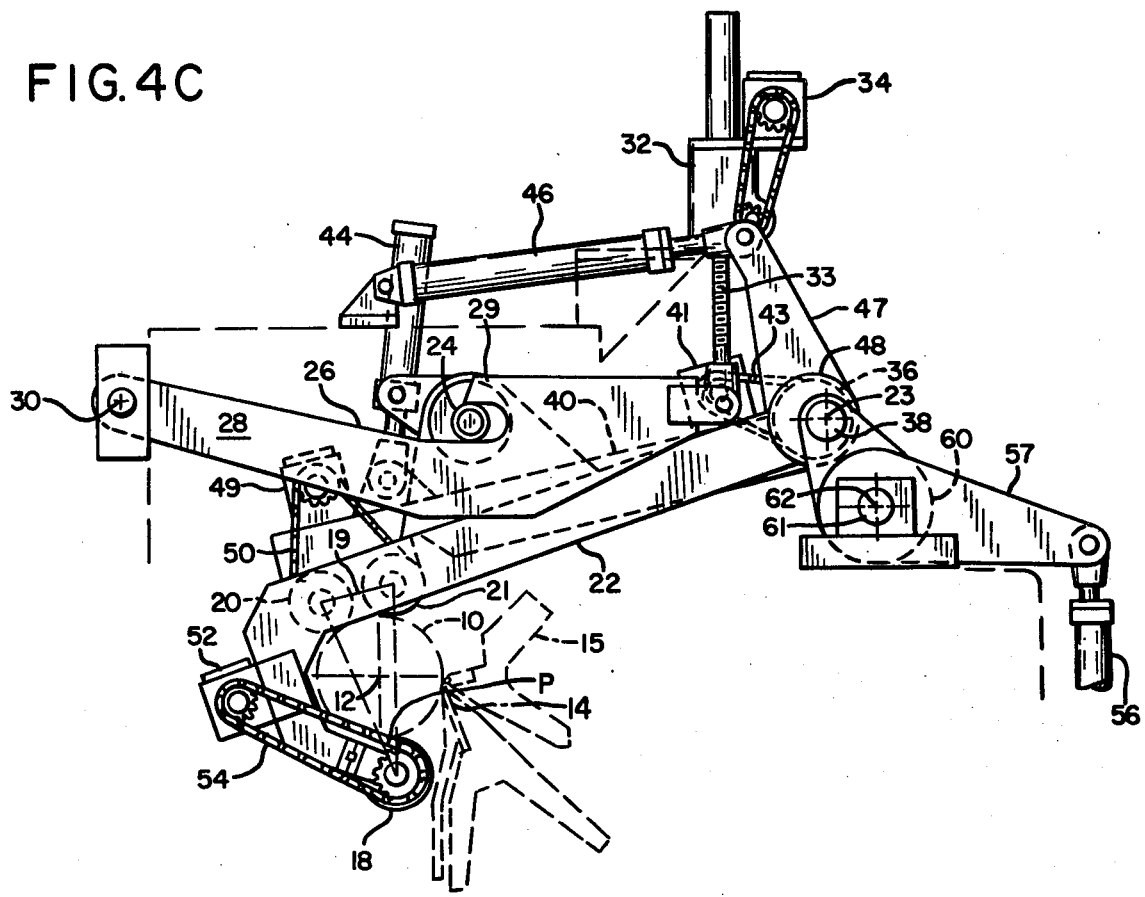
Figure 4D:
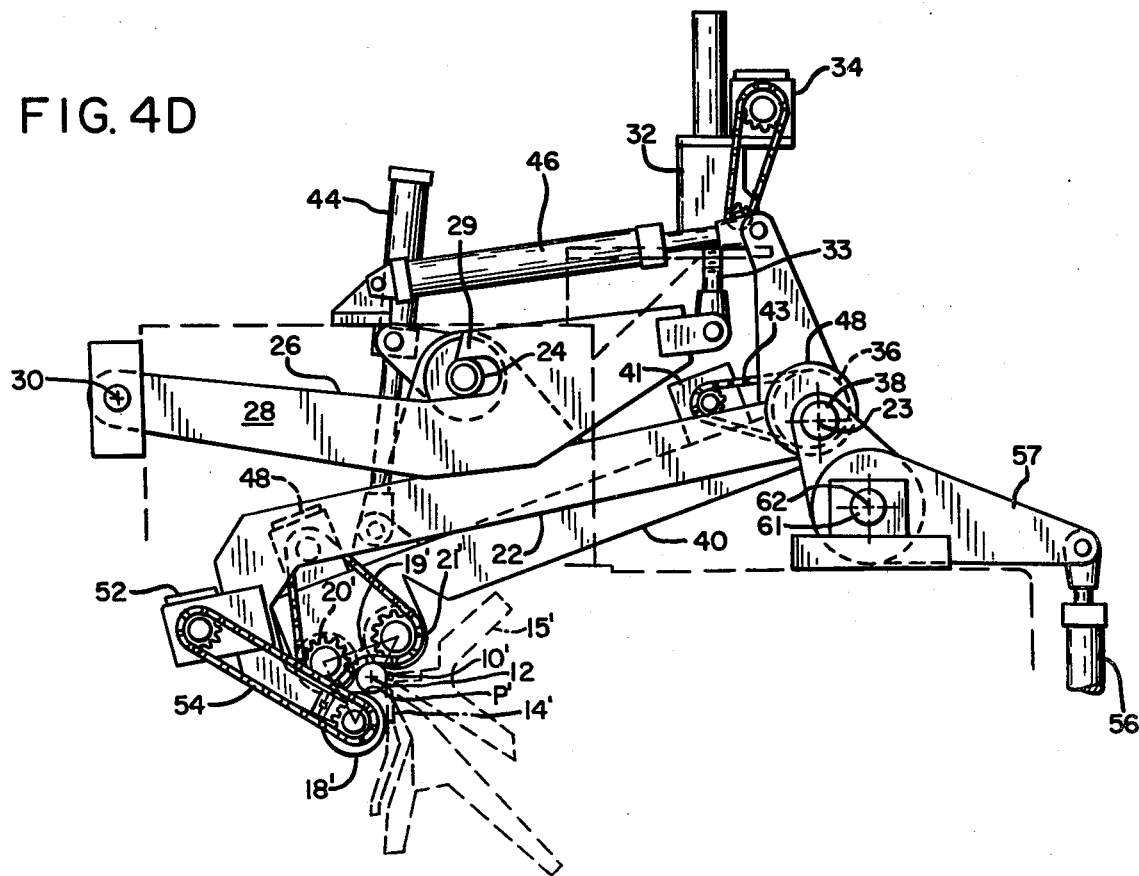

In the drive position of FIG. 4C the reference roll 18 is positioned completely beneath the log 10 in contact with the bottom of the log at pivot, P, and is locked in this reference position by the cam follower 24 moving beneath the hook projection 29 of the cam member 28. This is achieved by clockwise rotation of the main support shaft 60 by cylinder 56 which moves the pivot point 23 of the reference roll support arm 22 to the right relative to main axis 62 from the position of FIG. 4B. In a similar manner the pivot point of the upper support arm 40 is also moved to the right by rotation of the main support shaft 60 with cylinder 56. In the drive position of FIG. 4C, all three powered drive rolls 18, 20 and 21 are in contact with the sides of the log so that the lathe axis 12 is positioned within the clamp triangle 19 and motors 49 and 52 rotate such drive rolls to apply torque to such log to rotate it about the lathe axis. At this time the lathe spindles 13 can be disengaged from the log and such log rotated solely by the drive rolls 18, 20 and 21. However, sometimes it may be desirable to add the torque of the lathe spindles to that of the drive rolls for rotating the log in which case the larger diameter lathe spindles 13 are disengaged but a pair of smaller diameter spindles 13A remain engaged with the log. This limits the minimum size diameter 10' to which the log core can be peeled to the 3½ inch diameter of the smaller lathe spindles 13A. It should be noted that the second pair of small diameter spindles 13A are mounted coaxially with the large spindles 13 so that such second spindles remain engaged with the the log while the large spindles disengage from such log at small log diameters, as shown in FIG. 2.

As shown in FIG. 4D when the log is being peeled to its minimum diameter 10', the reference roll 18 is moved upward toward the lathe axis 12 and pivoted clockwise into position 18' so that its point of contact, P, moves clockwise to position P' through an acute angle $\theta_1$ about the lathe axis as illustrated in FIG. 1. This is accomplished by raising the cam member 28 and pivoting it about pivot 30 with the lead screw positioner 32 and motor 34 which also pivots the lower support arm 22 because it is locked by cam follower 24 and hook 29 to such cam member. At the same time the upper two drive rolls 20 and 21 are moved down into positions 20' and 21' by rotating the eccentric 36 with eccentric motor 41 and pivoting the upper support arm 40 and sleeve 42 counterclockwise about such eccentric by extending the piston of cylinder 44, as shown in FIG. 2. Both the positioning motor 34 and the eccentric motor 41 are synchronized to the movement of the lathe knife 14 to maintain the log clamped in contact between the drive rolls in their minimum log core positions 18', 20' and 21' so that the lathe axis 12 is kept within the clamping triangle 19.

It should be noted that the drive roll support arms 22 and 40 pivot past each other in a scissors-like motion about the common pivot shaft 38 during peeling to maintain the log clamped therebetween, in the steps of FIGS. 4C and 4D. Also, after peeling of the log is completed at the end of the operating step of FIG. 4D, the support arms 22 and 40 are raised into the raised position of FIG. 4A by extending cylinder 46 and retracting cylinder 44 after lowering cam 28 to unlock the cam follower 24 from hook 29. This completes one full cycle of operation.

It will be obvious to those having ordinary skill in the art that many changes may be made in the preferred embodiment of the invention. Therefore, the scope of the present invenion should be determined by the following claims.

I claim:
1. Veneer lathe apparatus, comprising:
three drive rolls at least one of which is powered;
support means for supporting said three rolls for rotation about mutually parallel axes of rotation and for causing said three rolls to engage the side of a log so that the log is clamped between said three rolls to cause rotation of said log about a lathe axis;
knife means supported for movement toward the lathe axis for peeling veneer from the log as it is rotated; and
reference means for moving one of the drive rolls toward and away from the other two drive rolls, for holding said one roll in a reference position during peeling so that it serves as a reference roll for said other two rolls, and for automatically adjusting said reference position of the reference drive roll in response to changes in the position of said knife means during peeling to maintain said reference drive roll in contact with said log.
2. Apparatus in accordance with claim 1 in which all three drive rolls are powered and extend along the major portion of the length of said log.
3. Apparatus in accordance with claim 1 in which the reference means includes a cam means for determining the path of horizontal movement of said reference roll and for locking the reference roll in a reference position during peeling, and automatic adjustment means for moving said cam means vertically in response to changes in position of the knife means during peeling to adjust said reference position.
4. Apparatus in accordance with claim 3 in which the reference means includes support shaft means mounted on pivot arms for rotation about a pivot axis and connected to a first support arm means for supporting said reference roll to move said first support arm means horizontally upon pivoting of said support shaft means on said pivot arms about a fixed main axis to off-set the pivot axis of said support shaft means horizontally, and for rotation of said first support arm means about said support shaft means so that a cam follower means attached to said first support arm means moves horizontally along said cam means to adjust the horizontal position of said reference roll.
5. Apparatus in accordance with claim 1 in which the other two drive rolls are supported on a common support means for movement toward and away from said reference drive roll while maintaining the spacing between said two drive rolls substantially constant.

6. Apparatus in accordance with claim 5 in which the common support means includes a second support arm means which pivots about an eccentric means which rotates in response to changes in the position of said knife means to adjust the position of the pivot axis of said second support arm means to maintain both of said two drive rolls in contact with said log during peeling.

7. Apparatus in accordance with claim 6 in which said eccentric means rotates about a support shaft means on which a first support arm means for supporting the reference roll is mounted for rotation.

8. Apparatus in accordance with claim 1 in which the reference roll is driven by a first motor means and the two other rolls are driven by a second motor means separate from said first motor means.

9. Apparatus in accordance with claim 8 in which the reference roll is provided with a rigid contact surface while the other two rolls are provided with compressible contact surfaces of different material than the contact surface of said reference roll.

10. Apparatus in accordance with claim 1 which also includes lathe spindle means for engaging the opposite ends of the log to rotate said log when peeling down to a predetermined log diameter, and actuation means for moving the support means to cause said three drive rolls to engage said log after the log is of said predetermined diameter.

11. Apparatus in accordance with claim 10 in which said lathe spindle means disengages the lathe spindles from the ends of said log after said drive rolls engage the side of the log.

12. Apparatus in accordance with claim 3 in which the cam means includes a cam member pivotally mounted at one end and having its other end connected to said adjustment means including a motor driven lead screw and having a hook portion on its cam surface for holding the cam follower in the locked vertical reference position.

13. Apparatus in accordance with claim 1 in which the reference drive roll is mounted on a first support arm means and the other two drive rolls are mounted on a second support arm means which pivots about the axis of rotation of said first support arm means to provide a scissors-like movement of said first and second support arm means to clamp the log between said reference roll and said other two drive rolls.

14. Apparatus in accordance with claim claim 1 in which the support means clamps the log between the drive rolls so that the lathe axis of rotation of the log is maintained during peeling within a triangular clamping area bounded by the distances between the three axes of rotation of the three drive rolls.

15. Veneer lathe apparatus, comprising:
three drive rolls at least one of which is powered;
support means for supporting said three rolls for rotation about mutually parallel axes of rotation and for causing said three rolls to engage the side of a log so that the log is clamped between said three rolls to cause rotation of said log about a lathe axis;
knife means supported for movement toward the lathe axis for peeling veneer from the log as it is rotated;
said three drive rolls extending along the major portion of the length of said log to prevent deflection of the log; and
reference means for moving one of the drive rolls toward and away from the other two drive rolls, for holding said one roll in a reference position during peeling so that it serves as a reference roll for said other two rolls, and for automatically adjusting said reference position of the reference drive roll during peeling so that the lathe axis of rotation of the log is maintained within a triangular clamping area formed by straight lines connecting the three axes of said drive rolls.

16. Apparatus in accordance with claim 15 in which all three drive rolls are powered.

17. Apparatus in accordance with claim 15 in which the reference means includes a cam means for determining the path of horizontal movement of said reference roll and for locking the reference roll in a reference position during peeling, and automatic adjustment means for moving said cam means vertically in response to changes in position of the knife means during peeling to adjust said reference position.

18. Apparatus in accordance with claim 17 in which the reference means includes support shaft means mounted on pivot arms for rotation about a pivot axis and connected to a first support arm means for supporting said reference roll to move said first support arm means horizontally upon pivoting of said support shaft means on said pivot arms about a fixed main axis to off-set the pivot axis of said support shaft means horizontally, and for rotation of said first support arm means about said support shaft means so that a cam follower means attached to said first support arm means moves horizontally along said cam means to adjust the horizontal position of said reference roll.

19. Apparatus in accordance with claim 15 in which the other two drive rolls are supported on a common support means for movement toward and away from said reference drive roll while maintaining the spacing between said two drive rolls substantially constant.

20. Apparatus in accordance with claim 19 in which the common support means includes a second support arm means which pivots about an eccentric means which rotates in response to changes in the position of said knife means to adjust the position of the pivot axis of said second support arm means to maintain both of said two drive rolls in contact with said log during peeling.

21. Apparatus in accordance with claim 20 in which said eccentric means rotates about a support shaft means on which a first support arm means for supporting the reference roll is mounted for rotation.

22. Apparatus in accordance with claim 17 in which the cam means includes a cam member pivotally mounted at one end and having its other end connected to said adjustment means including a motor driven lead screw and having a hook portion on its cam surface for holding the cam follower in the locked vertical reference position.

23. Apparatus in accordance with claim 15 in which the reference drive roll is mounted on a first support arm means and the other two drive rolls are mounted on a second support arm means which pivots about the axis of rotation of said first support arm means to provide a scissors-like movement of said first and second support arm means to clamp the log between said reference roll and said other two drive rolls.

* * * * *